United States Patent
Shibata

(10) Patent No.: US 9,495,734 B2
(45) Date of Patent: Nov. 15, 2016

(54) INFORMATION PROCESSING APPARATUS, SYSTEM, METHOD, AND MEDIUM STORING PROGRAM

(71) Applicant: NEC Corporation, Tokyo (JP)

(72) Inventor: Takashi Shibata, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/726,841

(22) Filed: Jun. 1, 2015

(65) Prior Publication Data
US 2015/0348248 A1    Dec. 3, 2015

(30) Foreign Application Priority Data
Jun. 2, 2014   (JP) .................................. 2014-113877

(51) Int. Cl.
*G06K 9/40* (2006.01)
*G06T 5/00* (2006.01)
*G06T 5/20* (2006.01)
*H04N 5/232* (2006.01)

(52) U.S. Cl.
CPC ................ *G06T 5/003* (2013.01); *G06T 5/20* (2013.01); *G06T 2207/10004* (2013.01); *G06T 2207/20024* (2013.01); *H04N 5/23212* (2013.01)

(58) Field of Classification Search
CPC ......... G06T 5/10; G06T 5/002; G06T 5/003; G06T 2200/12; H04N 1/409; H04N 1/58; A61B 5/7203
USPC .................................. 382/254, 260, 274–275
See application file for complete search history.

(56) References Cited

U.S. PATENT DOCUMENTS

| | | | | | |
|---|---|---|---|---|---|
| 7,319,797 | B2* | 1/2008 | Hung | ..................... | H04N 5/217 382/260 |
| 8,331,714 | B2* | 12/2012 | Van Beek | ............. | G06T 3/4007 382/255 |
| 8,605,970 | B2* | 12/2013 | Bar-Aviv | .................. | G06T 5/50 378/4 |
| 2003/0053708 | A1* | 3/2003 | Kryukov | .............. | H04N 19/865 382/261 |
| 2008/0219580 | A1* | 9/2008 | Porikli | ....................... | G06T 5/20 382/260 |

OTHER PUBLICATIONS

T. Chan et al., "The Digital TV Filter and Nonlinear Denoising", IEEE Transactions on Image Processing, vol. 10, No. 2, pp. 231-241, Feb. 2001.

* cited by examiner

*Primary Examiner* — Kanjibhai Patel
(74) *Attorney, Agent, or Firm* — Finnegan, Henderson, Farabow, Garrett & Dunner LLP

(57) ABSTRACT

An information processing apparatus may include a memory storing instructions and at least one processor configured to process the instructions to receive an input image. The input image includes either a first image or a provisional image created by iteratively image processing the first image. The instructions further provide for the processor to calculate a local variation of a focused pixel in the input image based on a difference in pixel value between the focused pixel and a surrounding pixel of the focused pixel, to calculate a filter coefficient for suppressing a variation between neighboring pixels in the input image based on the local variation, to create a degraded image by degrading the input image, to calculate a reconfiguration error between the input image and the degraded image, and to create the provisional image based on the filter coefficient and the reconfiguration error.

17 Claims, 7 Drawing Sheets

INFORMATION PROCESSING APPARATUS, SYSTEM, METHOD, AND MEDIUM STORING PROGRAM

CROSS-REFERENCE TO RELATED PATENT APPLICATION

This application is based upon and claims the benefit of priority from Japanese Patent Application No. 2014-113877, filed on Jun. 2, 2014, the disclosure of which is incorporated herein in its entirely by reference.

BACKGROUND

1. Technical Field

The present disclosure generally relates to processing of an image, and more particularly, to an information processing apparatus, an information processing system, an image processing method, and computer-readable storage medium storing a program that restores an image.

2. Description of the Related Art

Images photographed by digital cameras may be generally degraded due to mixing with image-degrading noise, such as sensor noise. Therefore, in some instances, denoising processing may be required. In other aspects, a photographed image may be a degraded image if the image has a low resolution or has blurring generated therein. In some instances, super resolution processing for enhancing the resolution of the image or deblurring processing for reducing the blurring may be required.

A common image restoration method used for restoring an image that is degraded due to mixing with noise (hereinafter, represented as "degraded image") may include calculating a difference between a denoised image (hereinafter, represented as "restored image") and the degraded image. Further, the common image restoration method may include calculating the extent of smoothness of the entire restored image. Further, the common image restoration method may include creating a restored image, which is an image for which the calculated difference is small, and the entire restored image is smooth.

In some aspects, the common image restoration method may use an objective function in which a term for smoothing an image (hereinafter, represented as "regularization term") is added to a term represented using the sum of squares of a difference between a degraded image and a restored image (hereinafter, represented as "data term"). Further, the common image restoration method may determine (create) the restored image such that the objective function can be minimized.

As a regularization term, total variation (TV) regularization may be widely used. The TV regularization may assume that an image includes a region with a small change in pixel value between neighboring pixels and a region with a large change in pixel value between neighboring pixels (region in which sharp change occurs). Further, based on that assumption, the TV regularization may apply a penalty depending on the $L_1$ distance between high-frequency components to the restored image. The "$L_1$ distance" may be the sum of absolute differences between vector components where pixels are represented as vectors.

The technology described in a related art document may use linear filter processing to minimize the objective function, including the TV regularization term. The technology may create a denoised restored image based on the above-mentioned method. This method may be called DTVF (Digital TV Filter).

The DTVF will be further described with reference to the drawing.

FIG. 7 is a block diagram illustrating an example of the configuration of an information processing apparatus 90 which may use the DTVF.

As illustrated in FIG. 7, the information processing apparatus 90 that uses the DTVF may include a variation calculation unit 910, a filter coefficient calculation unit 920, and a filter processing unit 930. The variation calculation unit 910 may calculate a local variation based on values of differences between the luminance of a focused pixel and the luminance of surrounding pixels of the focused pixel. Based on the calculated local variation, the filter coefficient calculation unit 920 may calculate a filter coefficient matrix for suppressing a variation between neighboring pixels. The filter processing unit 930 may perform filter processing of an image using the calculated filter coefficient matrix. The variation calculation unit 910 may calculate a local variation in the filtered image. The information processing apparatus 90 may iterate this processing to create a restored image (output image). The information processing apparatus 90 using the DTVF may denoise the image by using the above-mentioned iterative processing. In this manner, the processing using the simple nonlinear filter may be configured. Accordingly, the denoising processing described in the related art document generally may have a low calculation cost.

However, the technology described in the related art document may be a method specializing in denoising. Accordingly, the technology cannot be utilized to image restoration processing different from the denoising super resolution processing and deblurring processing, for example.

Specifically, this limitation may be present because of the following reasons. The nonlinear filter used in the related art document may be a filter that is designed to minimize the sum of squares of differences between a restored image and a degraded image. This may be generally because noise is added on a random basis. However, small differences between a restored image and a degraded image may not be necessarily preferable. For example, differences between a degraded image and a restored image deblurred by use of deblurring processing may be generally large. For this reason, the technology described in the related art document may not be applicable to image restoration processing such as deblurring processing.

In other aspects, the technology described in the related art document may have a problem of being unusable for the degraded-image restoration processing other than the denoising.

Exemplary embodiments of the present disclosure may solve one or more of the above-noted problems. For example, the exemplary embodiments may provide an information processing technique for creating a restored image supported by denoising and other degraded-image restoration.

SUMMARY OF THE DISCLOSURE

According to one embodiment of the present disclosure, an information processing apparatus for iteratively image processing is disclosed. The information processing apparatus may include a memory storing instructions; and at least one processor configured to receive an input image. The input image includes either a first image or a provisional image created by iteratively image processing the first image. The processor is further configured to calculate a local variation of a focused pixel in the input image based on a difference in pixel value between the focused pixel and a surrounding pixel of the focused pixel, to calculate a filter coefficient for suppressing a variation between neighboring pixels in the input image based on the local variation, to create a degraded image by degrading the input image, to calculate a reconfiguration error between the input image and the degraded image, and to create the provisional image based on the filter coefficient and the reconfiguration error.

According to another embodiment of the present disclosure, an information processing method for iteratively image processing may include receiving an input image, the input image including either a first image or a provisional image created by iteratively image processing the first image. The method may further include calculating a local variation of a focused pixel in the input image based on a difference in pixel value between the focused pixel and a surrounding pixel of the focused pixel, calculating a filter coefficient for suppressing a variation between neighboring pixels in the input image based on the local variation, creating a degraded image by degrading the input image, calculating a reconfiguration error between the input image and the degraded image, and creating the provisional image based on the filter coefficient and the reconfiguration error.

In another embodiment of the present disclosure, a non-transitory computer-readable storage medium may store instructions that, when executed by a computer, enable the computer to implement a method. The method may include receiving an input image, the input image including either a first image or a provisional image created by iteratively image processing the first image, calculating a local variation of a focused pixel in the input image based on a difference in pixel value between the focused pixel and a surrounding pixel of the focused pixel, calculating a filter coefficient for suppressing a variation between neighboring pixels in the input image based on the local variation, creating a degraded image by degrading the input image, calculating a reconfiguration error between the input image and the degraded image, and creating the provisional image based on the filter coefficient and the reconfiguration error.

DETAILED DESCRIPTION

Hereinafter, embodiments of the present disclosure will be described with reference to the accompanying drawings. Wherever possible, the same reference numbers will be used throughout the drawings to refer to the same or like parts. The present disclosure is not limited to the illustrations in the respective drawings.

First Exemplary Embodiment

A first exemplary embodiment in the disclosure will be described in detail with reference to the drawings.
(Information Processing System)

Figure 1:
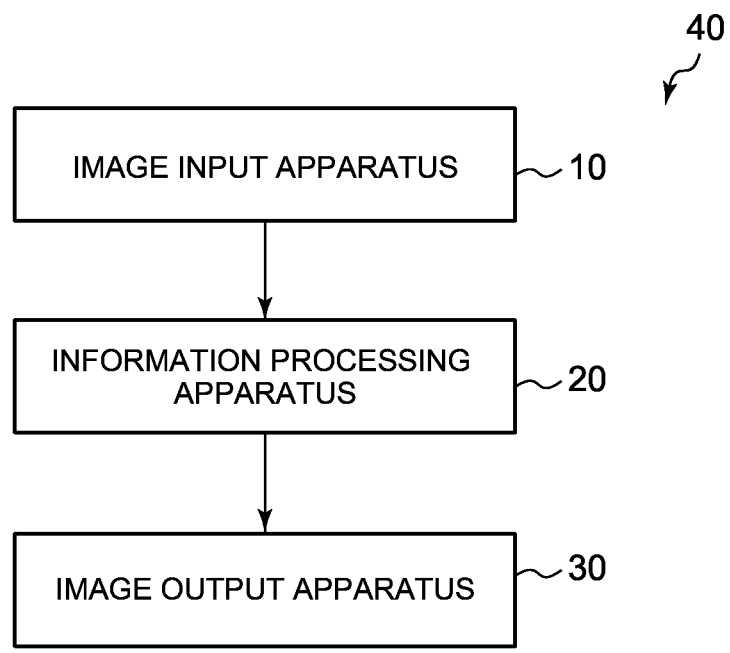
FIG. 1 is a block diagram illustrating an example of the configuration of an information processing system including an information processing apparatus according to a first exemplary embodiment.

FIG. 1 is a block diagram illustrating an example of the configuration of an information processing system 40 including an information processing apparatus 20 according to the first exemplary embodiment.

As illustrated in FIG. 1, the information processing system 40 may include an image input apparatus 10, the information processing apparatus 20, and an image output apparatus 30.

The image input apparatus 10 may create or obtain (receive) an image, and supply the image to the information processing apparatus 20. The image input apparatus 10 is not particularly limited, but may be any device that can obtain an image. For example, the image input apparatus 10 may be a camera or a scanner.

The image obtained by the image input apparatus 10 may be a degraded image. Hereinafter, the degraded image inputted to the information processing apparatus 20 by the image input apparatus 10 may be represented using a column vector "v" in which pixel values of respective pixels are arranged in raster scan order. Hereinafter, this vector may be represented as an "input image vector v", a "vector v", or a "degraded image v". For example, when the number of pixels of a degraded image is n (n is a natural number), a vector v may be a column vector of 1×n. A pixel value at a pixel α of the vector v (degraded image v) may be represented as "$v_\alpha$".

In the present embodiment, a pixel value is not particularly limited. For example, the pixel value may be a luminance value or an illumination value. Hereinafter, as an example, the description may be made using the luminance value as the pixel value.

The image output apparatus 30 may be an apparatus which receives a restored image (output image) created by the information processing apparatus 20, and may execute output processing, such as screen displaying. The image output apparatus 30 may not be particularly limited, but may be any apparatus that can output (for example, display or print) an image. For example, the image output apparatus 30 may be a display apparatus or a printer apparatus.

The restored image may also be represented, similar to the input image, using a column vector "u" in which pixel values of respective pixels are arranged in raster scan order. Hereinafter, this vector may be represented as a "restored image vector u", a "vector u", or a "restored image u". For example, when the number of pixels of a vector u (restored image u) is m (m is a natural number), the vector u may be a column vector of 1×m.

As will be described below, the information processing apparatus 20 may perform iterative processing on a restored image (output image). A vector of the restored image after k-th iterative processing may be represented as "$u^{(k)}$". The restored image may be a provisional restored image because the restored image is subjected to the iterative processing.

Accordingly, the restored image (output image) may also be represented as a "provisional restored image" in some aspects. For example, the information processing apparatus 20 may again process the output image having been output to the image output apparatus 30, as an input image or a provisional restored image, based on an instruction by a user.

The information processing apparatus 20 may be an apparatus that creates a restored image (output image) based on a degraded image (input image). The information processing apparatus 20 will be further described with reference to the drawings.

(Description of Configuration)

A configuration of the information processing apparatus 20 will be described with reference to the drawings.

Figure 2:
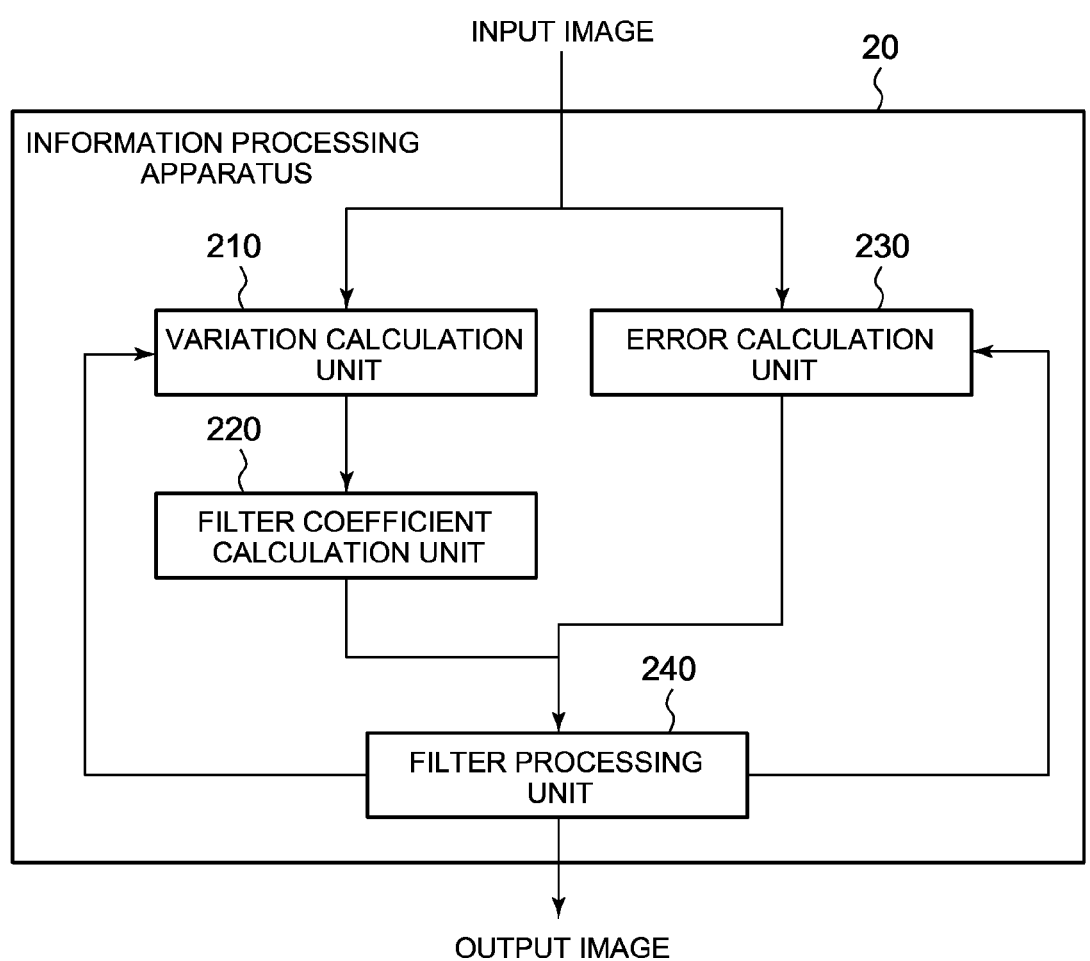
FIG. 2 is a block diagram illustrating an example of the configuration of the information processing apparatus according to the first exemplary embodiment.

FIG. 2 is a block diagram illustrating an example of the configuration of the information processing apparatus 20 according to the first exemplary embodiment.

As illustrated in FIG. 2, the information processing apparatus 20 may receive an input image, and create and transmit an output image. Further, the information processing apparatus 20 may store an input image and/or an output image in a storage unit. For example, the information processing apparatus 20 may receive an input image from the image input apparatus 10, and after storing the input image in the storage unit, execute an operation described below. Alternatively or additionally, the information processing apparatus 20 may execute the operation described below, and after storing an output image in the storage unit, transmit the stored output image to the image output apparatus 30.

As illustrated in FIG. 2, the information processing apparatus 20 according to the first exemplary embodiment may include a variation calculation unit 210, a filter coefficient calculation unit 220, an error calculation unit 230, and a filter processing unit 240.

As illustrated in FIG. 2, the information processing apparatus 20 may perform iterate processing, as described below. In some embodiments, the variation calculation unit 210 may receive and process both of an input image (degraded image v), and an output image (restored image u) processed by the filter processing unit 240. In the following description for the elements included in the information processing apparatus 20, the description is made using the degraded image v (vector v) and the restored image u (vector u) interchangeably if a distinction is not necessary between the images and the vectors in that embodiment.

The variation calculation unit 210 may receive an image used for processing. At the beginning, more specifically, in a case in which iterative processing is not yet performed once (i.e., in a case where the number of iterations k is "k=0"), the variation calculation unit 210 may receive an input image that has not yet been iteratively processed. During the iterative processing, the variation calculation unit 210 may receive an output image (provisional restored image), which will be described below, processed by the filter processing unit 240.

The variation calculation unit 210 may calculate a "local variation" for a luminance value of a focused pixel, which is a target of processing in the received image, based on values of differences between the luminance value of the focused pixel and luminance values of surrounding pixels of the focused pixel. The "local variation" may be a variation for which the value becomes larger as the values of differences between the luminance value of a focused pixel and the luminance values of the surrounding pixels of the focused pixel become larger. In other aspects, the local variation may be a variation indicating the change amount or the magnitude of difference in luminance value between a focused pixel and its surrounding pixels. The local variation is not particularly limited, but may be any variable that indicates the magnitude of the change amount in the luminance value of a focused pixel. For example, the variation calculation unit 210 may use "$|\nabla_\alpha u^{(k)}|_\varepsilon$" represented in an equation 1 as local variation in an α-th pixel (hereinafter, represented as "pixel α") of the vector u. However, a calculation method of a local variation is not limited to the equation 1.

$$|\nabla_\alpha u^{(k)}|_\varepsilon = \sqrt{\Sigma_{\beta \in N(\alpha)} \left(u_\beta^{(k)} - u_\alpha^{(k)}\right)^2 + \varepsilon^2} \quad \text{[Equation 1]}$$

In the equation 1, "$\nabla$" may represent a vector differential operation. "$\nabla_\alpha u$" may represent a result of the differential operation in the α-th pixel (pixel α) of the vector u.

As described above, "$u^{(k)}$" may be a vector corresponding to an image after the k-th (k: integer) iterative processing. Further, "$u^{(k)}$" may represent a pixel value (luminance value) of an α-th pixel (pixel α) of the vector u after the k-th iterative processing. "$u_\alpha^{(0)}$" may be a value of a pixel α of the vector v (input image vector v). "$u_\alpha^{(1)}$" may represent a value of a pixel $u^{(1)}$ of a vector $u^{(1)}$ after the first iterative processing.

"N(α)" may represent a set of neighboring pixels of the α pixel. In other aspects, a pixel β in the equation 1 may be a pixel included in the set N(α). For example, when the coordinate of the pixel α is (i, j) and N(α) is eight neighbor pixels of the pixel α, coordinates of the eight pixels included in N(α) may be {(i, j±1), (i±1, j), (i−1, j±1), (i+1, j±1)}".

"ε" may be a constant term for preventing division by zero in the processing described later. ε may be set in advance in the information processing apparatus 20. For example, the information processing apparatus 20 may receive a value of ε in advance from an apparatus, which is not illustrated, operated by the user.

The variation calculation unit 210 may transmit the calculated local variation to the filter coefficient calculation unit 220.

The filter coefficient calculation unit 220 may calculate, based on the received local variation, a filter coefficient (which is represented using a matrix in the following description, and which is referred to as "filter coefficient matrix") for suppressing a variation between neighboring pixels. The "filter coefficient matrix" may be a coefficient matrix used for convolution processing in a space region in the processing of an image. Accordingly, the filter coefficient matrix may also be represented as a convolution matrix, a kernel, or an operator in some cases.

The filter coefficient matrix used in the present embodiment is not particularly limited. For example, the filter coefficient calculation unit 220 may use a value ($W_{\alpha\beta}(u)$) represented in an equation 2 and an equation 3, as an element of α rows and β columns of a filter coefficient matrix (W). The element of α rows and β columns of the filter coefficient matrix represented in the equation 2 and the equation 3 may represent a filter coefficient between the α-th pixel and the β-th pixel.

$$W_{\alpha\beta}(u) = \begin{cases} \sum_\beta \dfrac{1}{|\nabla_\alpha u^{(k)}|_\varepsilon^\gamma} + \dfrac{1}{|\nabla_\beta u^{(k)}|_\varepsilon^\gamma} & \alpha = \beta \\ -\dfrac{1}{|\nabla_\alpha u^{(k)}|_\varepsilon^\gamma} - \dfrac{1}{|\nabla_\beta u^{(k)}|_\varepsilon^\gamma} & \alpha \neq \beta \end{cases} \quad \text{[Equation 2]}$$

$$W_{\alpha\beta}(u) = \begin{cases} \sum_{\beta} \dfrac{1}{|\nabla_{\beta} u^{(k)}|_{\varepsilon}^{\gamma}} & \alpha = \beta \\ -\dfrac{1}{|\nabla_{\beta} u^{(k)}|_{\varepsilon}^{\gamma}} & \alpha \neq \beta \end{cases} \quad \text{[Equation 3]}$$

In the equation 2 and the equation 3, "γ" may be a parameter to adjust weighting. The information processing apparatus 20 may store "γ" prior to the above-mentioned processing. For example, a user of the information processing apparatus 20 may set "γ" in advance. In an embodiment in which an image is reconfigured using regularization using an $L_1$ distance, the information processing apparatus 20 may set "γ" to "1". In another embodiment in which an $L_p$ distance (norm) is used as a typical distance for regularization, the information processing apparatus 20 may set "γ" to "2-p (this p indicates a norm p)" in the equation 2 or the equation 3. Further, the information processing apparatus 20 may receive in advance a value of "p" from the user of the information processing apparatus 20. Alternatively or additionally, the information processing apparatus 20 may calculate a value of "p" based on predetermined learning processing calculation.

In the description of equation 2 and the equation 3, for easy view of the indication, "(k)", which represents the number of iterations of the element $W_{\alpha\beta}(u)$ of the filter coefficient matrix, is omitted.

Each element of the filter coefficient matrix used in the present embodiment may satisfy the following two conditions:

1) As for off-diagonal components, the smaller a local variation of two pixels corresponding to each element, the larger the value of the element.

2) All the sums of values of elements in each row and each column are "0".

In some aspects, the elements of the filter coefficient matrix are not limited to the value represented in the equation 2 and the equation 3 as long as the elements satisfy the abovementioned two conditions.

The filter coefficient calculation unit 220 may transmit the calculated filter coefficient matrix to the filter processing unit 240.

The error calculation unit 230 may receive an image used for the processing. At the beginning, more specifically, in an embodiment in which iterative processing is not performed even once (i.e., in a case where the number of iterations k is "k=0"), the error calculation unit 230 may receive an input image. During the iterative processing, the error calculation unit 230 may receive an image processed by the filter processing unit 240 described below.

The error calculation unit 230 may create an image that is the received image being degraded (for example, a low resolution image or a blurred image, hereinafter, represented as "second degraded image"). A method of degradation in the error calculation unit 230 is not particularly limited. For example, the error calculation unit 230 may use predetermined simulation processing to degrade the received image.

The error calculation unit 230 may calculate a difference (hereinafter, represented as "reconfiguration error") between the input image (hereinafter, represented as "first degraded image" for being distinguished from the second degraded image) and the second degraded image. The "reconfiguration error" may be a difference of which the value becomes larger as the difference between the second degraded image and the input image (first degraded image) becomes larger. In other aspects, the reconfiguration error may be a difference between a pixel value of an image (second degraded image) obtained by degrading an image after the k-th iterative processing (for example, by reducing and/or blurring the image) and a pixel value of the input image (first degraded image). For example, the error calculation unit 230 may use an error ($d_\alpha$) defined for a pixel α represented in an equation 4 as a reconfiguration error. The calculation method of a reconfiguration error is not particularly limited as long as the method uses a function to degrade the received image. In other aspects, the calculation method of a reconfiguration error is not limited to the equation 4.

$$d_\alpha = \sum_{\beta\gamma} B_{\beta\alpha} B_{\beta\gamma} u_\gamma^{(k)} - \sum_{\beta\gamma} B_{\beta\alpha} U_{\beta\gamma} v_\beta \quad \text{[Equation 4]}$$

In the equation 4, U and B may be matrices that represent processing of enlargement and processing of blurring (blur), respectively. $U_{\alpha\beta}$ and $B_{\alpha\beta}$ respectively represent elements of α rows and β columns of the matrixes. Similar to the description of the equation 2 and the equation 3, "(k)", which represents the number of iterations of the reconfiguration error ($d_\alpha$), is omitted in the description of the equation 4 for brevity and to simplify the description, though it may be understood to be included in these equations.

When the number of pixels of the image (output image) received from the filter processing unit 240 is m, the matrix B may be a square matrix of m×m. Further, each element ($B_{\alpha\beta}$) of the matrix B may be a real number. The error calculation unit 230 may calculate each element ($B_{\alpha\beta}$) of the matrix B based on a modulation transfer function (MTF) or a point spread function (PSF) in an optical system assumed in advance. For example, the error calculation unit 230 may calculate a value of each element ($B_{\alpha\beta}$) of the matrix B based on the MTF or the PSF in an optical system of the image input apparatus 10.

When the number of pixels of the degraded image v is n, the matrix U may be a matrix of m×n. Further, an element ($U_{\alpha\beta}$) of the matrix U may be "1" or "0". The error calculation unit 230 may calculate a value of each element ($U_{\alpha\beta}$) of the matrix U based on the enlargement ratio in the filter processing unit 240.

The error calculation unit 230 may transmit the calculated reconfiguration error to the filter processing unit 240.

The filter processing unit 240 may create an output image based on the image after the iterative processing by the filter processing unit 240, the filter coefficient matrix received from the filter coefficient calculation unit 220, and the reconfiguration error received from the error calculation unit 230. The filter processing unit 240 may execute the iterative processing. Accordingly, as described above, the output image may also be a provisional restored image. Further, at the start of the image processing before iterative processing has been performed even once (in a case where the number of iterations k is "k=0"), the filter processing unit 240 may use an unprocessed input image instead of the image subjected to the iterative processing. In some instances, the output image may be a denoised image, a deblurred image, or a super resolution image.

However, the filter processing by the filter processing unit 240 is not limited to the manner discussed above. F example, the filter processing unit 240 may perform filter calculation, as represented in an equation 5 or an equation 6, as creation of an output image. In other embodiments, the filter processing unit 240 may create, based on an output image ($u^{(k)}$) after the k iterations, an output image ($u^{(k+1)}$) after the k+1 iterations.

$$u_\alpha^{(k+1)} = \frac{1}{\mu + \sum_\gamma W_{\alpha\gamma}} \left[ \mu u_\alpha^{(k)} - \mu d_\alpha + \sum_{\gamma \neq \alpha} W_{\alpha\gamma} u_\gamma^{(k)} \right]$$ [Equation 5]

$$u_\alpha^{(k+1)} = u_\alpha^{(k)} - \tau \left[ \mu d_\alpha + \sum_{\gamma \neq \alpha} W_{\alpha\gamma} u_\gamma^{(k)} \right]$$ [Equation 6]

In the equation 5 or the equation 6, "µ" may be a parameter to adjust the intensity of TV regularization. µ may be set in advance in the filter processing unit 240. For example, the information processing apparatus 20 may receive a value to be set to µ in advance from an apparatus, which is not illustrated, operated by the user. Alternatively or additionally, the information processing apparatus 20 may calculate µ based on a learning image received in advance.

The equation 5 or the equation 6 may be a linear combination of a value obtained by multiplying the pixel value of the pixel α by a predetermined number (multiplying by µ), a value obtained by multiplying the reconfiguration error by a predetermined number (multiplying by µ), and the product of the filter coefficient matrix and the pixel value of the pixel α.

Super resolution processing or deblurring processing may be easy to generate a phenomenon (error) termed "ringing." Therefore, after the above-mentioned processing, in some embodiments, in order to reduce the ringing, the filter processing unit 240 may execute processing by storing a binary pattern that represents a magnitude relationship between neighboring pixels for storing the magnitude relationship between neighboring pixels.

In the following description, as an example, a description is made using the following method as a method of storing the magnitude relationship between neighboring pixels. In other aspects, the method may be a method of processing by representing the ranks of pixel values as a binary pattern. However, the information processing apparatus 20 disclosed herein is not limited to use of this embodiment of the method.

For an α-th pixel, the filter processing unit 240 may perform sampling of surrounding pixels of the α-th pixel. The filter processing unit 240 may calculate the ordinary number (the rank of the pixel value) of the α-th pixel in the set of the sampled surrounding pixels when the pixels are sorted in descending order. The filter processing unit 240 may store the sampled set as a local binary pattern image. Hereinafter, this local binary pattern image may be represented as an "input local binary pattern image".

In a case where the magnitude of the pixel values in the sampled set can be considered to be the same value (i.e., in a case where a difference in magnitude among the pixel values is within the range of a predetermined value), the filter processing unit 240 may determine the rank of the α-th pixel using a random number.

In some embodiments, the processing that the filter processing unit 240 implements to create a local binary pattern image is not limited to the processing that uses calculation of the ranks. For example, when an α-th pixel value in an input binary pattern image is set as "$s_\alpha$", the filter processing unit 240 may define, as the "$s_\alpha$", a value represented in an equation 7, in which a step function is approximated by a differentiable function.

$$s_\alpha = \sum_{j \in N(\alpha)} h(u_\alpha - u_j)$$ [Equation 7]

In the equation 7, "h" may indicate a threshold function made to be differentiable using a sigmoid function (σ).

The sigmoid function may be a function represented as "$\sigma(x) = 1/(1+e^{-ax})$". "a" may be a predetermined constant, and may be called a gain.

The threshold function may be a common threshold function, i.e., a function of which value changes at a threshold value as a boundary. For example, the threshold function may be a function of which value becomes "1" when an argument exceeds the threshold value, and becomes "0" in other cases.

For example, the filter processing unit 240 may use, as "h", a function that is defined by any equation represented in the following equation 8.

$$h(u) = \frac{1}{1 + \exp(u/\sigma)}$$ [Equation 8]

$$h(u) = \frac{1}{1 + \exp((u-\eta)/\sigma)} + \frac{1}{1 + \exp((u+\eta)/\sigma)}.$$

"η" may be a parameter that the user of the information processing apparatus 20 sets in advance to the information processing apparatus 20. "η" may correspond to the reciprocal number of the gain in the sigmoid function.

The filter processing unit 240 may similarly create a local binary pattern image for a provisional restored image (output image) that is obtained after a predetermined numbered (k-th) iteration. Hereinafter, a local binary pattern image for a provisional restored image may be represented as a "provisional binary pattern image". The filter processing unit 240 may execute the filter processing such that the "input local binary pattern image" and the "provisional binary pattern image" approximately match each other. In other embodiments, the filter processing unit 240 may execute the filter processing such that the rank of a pixel value of the α-th pixel is stored.

According to some embodiments, the processing may be implemented as described below.

When an α-th pixel value in an input binary pattern image is set as $s_\alpha$, and an α-th pixel value in a provisional binary pattern image after the k-th iteration is set as $s_\alpha^{(k)}$, the filter processing unit 240 may update, as represented in an equation 9, a pixel value $u_\alpha^{(k+1)}$, for example.

$$u_\alpha^{(k+1)} \leftarrow u_\alpha^{(k+1)} - \phi(s_\alpha^{(k)} - s_\alpha)$$ [Equation 9]

"φ" may be a value (parameter) that the user of the information processing apparatus 20 inputs in advance to the information processing apparatus 20.

In some embodiments, the update in the filter processing unit 240 may not be limited to the method represented in the above-mentioned equation 9 in which the pixel value $u_\alpha^{(k+1)}$ is updated to be in proportion to a value of a difference between the input binary pattern image and the provisional binary pattern image. For example, the filter processing unit 240 may update the pixel value $u_\alpha^{(k+1)}$ as represented in the following equation 10.

$$u_\alpha^{(k+1)} \leftarrow u_\alpha^{(k+1)} - \phi \cdot g(s_\alpha^{(k)} - s_\alpha).\qquad\text{[Equation 10]}$$

A function "g" may be an increasing function related to an argument ($s_\alpha^{(k)}-s_\alpha$). However, the function g is not limited to such embodiments and may include other functions related to an increasing function. For example, the function g may be a primary function of a positive inclination. A coefficient "ϕ" may be a predetermined constant. For example, the user of the information processing apparatus 20 may input and set in advance a value of the coefficient "ϕ" to the filter processing unit 240.

However, the processing by the filter processing unit 240 is not limited to the embodiment described above. For example, in other embodiments, the filter processing unit 240 may define "$s_\alpha$" using the differentiable function represented in the equation 7, and may use the definition represented in an equation 11 to a coefficient "ϕ" as a coefficient having a different value for each pixel using a derivative function (h') of "h".

$$\phi_\alpha = \tau \sum_{j \in N(\alpha)} h'(u_\alpha - u_j)\qquad\text{[Equation 11]}$$

In the equation 11, "τ" may be a predetermined constant. For example, the user of the information processing apparatus 20 may set a value of "τ" in advance to the information processing apparatus 20.

As illustrated in the equation 9 or the equation 10, the filter processing unit 240 may update the pixel value $u_\alpha^{(k+1)}$ such that as the value of difference between the input binary pattern image and the provisional binary pattern image becomes larger, the pixel value becomes small.

The filter processing unit 240 may calculate a function g, a coefficient ϕ, or a coefficient τ using a learning image prepared in advance and a predetermined method (for example, regression analysis).

For example, the filter processing unit 240 may receive a learning image prepared in advance. Further, the filter processing unit 240 may create a binary pattern image in the received learning image. In other instances, the filter processing unit 240 may receive a learning image including a binary pattern image.

The filter processing unit 240 may calculate information entropies in local regions of these images. In addition, the filter processing unit 240 may calculate "$\xi_1^\alpha$", "$\xi_2^\alpha$", and "$\theta^\alpha$" (described later), which are respectively a first main component, a second main component, and a mean value of angles of luminance gradient of a matrix containing a set of luminance components within a local region having the α-th pixel as the center. Further, the filter processing unit 240 may calculate a coefficient ϕ or a coefficient T based on the calculated values using the predetermined method (for example, regression analysis).

In some embodiments, the filter processing unit 240 may execute the following operation.

The filter processing unit 240 may degrade a learning image to create a low resolution image. The filter processing unit 240 may use the low resolution image to create an input binary pattern image. The filter processing unit 240 may create a binary pattern image (hereinafter, represented as "learning binary pattern image") based on a learning image. The filter processing unit 240 may calculate a value of a difference (hereinafter, "binary pattern difference $\delta_B$") between the input binary pattern image and the learning binary pattern image. The filter processing unit 240 may calculate, based on the input binary pattern image, "$\xi_1^\alpha$", "$\xi_2^\alpha$", and "$\theta^\alpha$" (described later), which are respectively a first main component, a second main component, and a mean value of angles of a matrix containing a set of luminance components within a local region, and an information entropy (S). The filter processing unit 240 may learn a conditional probability distribution function "$P(\delta_B|\xi_1^\alpha, \xi_2^\alpha, \theta^\alpha, S)$" for "$\xi_1^\alpha$", "$\xi_2^\alpha$", "$\theta^\alpha$", and "S" using the regression analysis or a similar analysis with a binary pattern difference ($\delta_B$) set as a probability variable.

In embodiments implementing learning using the regression analysis, the filter processing unit 240 may hypothesize a Gaussian distribution or a hyper-Laplacian distribution as the probability distribution function, for example. The filter processing unit 240 may calculate hyper-parameters (an average and a variance of the Gaussian distribution, and the like) of these hypothesized distributions using a least-squares method or a similar method.

For example, in a case where the Gaussian distribution is hypothesized as a probability distribution function, the filter processing unit 240 may calculate a coefficient ϕ as a function using a variance of the Gaussian distribution as an argument. Alternatively or additionally, in an embodiment in which the hyper-Laplacian distribution is hypothesized as a probability distribution function, the filter processing unit 240 may calculate a coefficient ϕ as a function using an index of the hyper-Laplacian distribution as an argument.

In some embodiment, the filter processing unit 240 may not use the method based on the regression, as described above. For example, the filter processing unit 240 may set a coefficient ϕ or a coefficient τ to have a value in a case where a pixel α of interest is in the vicinity of an edge region.

In the foregoing description, the filter processing unit 240 may update a pixel value $u_\alpha^{(k+1)}$ using the equation 9 or the equation 10 after the processing of the equation 5 or the equation 6. However, the operation of the information processing apparatus 20 according to presently disclosed embodiments is not necessarily limited to this operation. For example, the information processing apparatus 20 may execute an update using the equation 9 or the equation 10 in odd-numbered iterations. Alternatively or additionally, the information processing apparatus 20 may execute the processing using the equation 9 or the equation 10 after completion of the processing using the equation 5 or the equation 6. Alternatively or additionally, the information processing apparatus 20 may iterate the processing using the equation 9 or the equation 10 at two or more times after the processing using the equation 5 or the equation 6.

In this manner, as long as the information processing apparatus 20 performs processing such that the input local binary pattern image and the provisional binary pattern image match with each other, the order and the number of iterations of the processing using the equation 9 or the equation 10 are not limited to a fixed quantity and may vary depending upon the implementation.

In the foregoing description, as a method of storing the magnitude relationship between neighboring pixels, the method. of processing by representing the ranks of the pixel values as a binary pattern has been described. However, the information processing apparatus 20, according to presently disclosed embodiments, is not limited to the implementation described above.

For example, the filter processing unit 240 may update a pixel value $u_\alpha$ while directly applying a constraint so as to store the magnitude relationship between pixels. For example, the filter processing unit 240 may update a pixel value as represented in an equation 12.

$$u_\alpha^{(k+1)} \leftarrow u_\alpha^{(k+1)} - 2\tau \cdot \sum_{j \in N(\alpha)} h'\left(u_\alpha^{(k+1)} - u_j^{(k+1)}\right) \cdot \quad \text{[Equation 12]}$$
$$\left(h\left(u_\alpha^{(k+1)} - u_j^{(k+1)}\right) - h\left(u_\alpha^{(0)} - u_j^{(0)}\right)\right).$$

In the equation 12, "$\tau$" may be a predetermined constant. For example, the user of the information processing apparatus 20 may set a value of "$\tau$" in advance by providing an input to the information processing apparatus 20.

The update using the equation 11 and the equation 12 may be equivalent to further adding, in addition to the TV regularization, as a regularization term, a regularization term represented in an equation 13 or an equation 14 below.

$$R(u) = \left( \sum_{j \in N(\alpha)} h(u_\alpha - u_j) - \sum_{j \in N(\alpha)} h(u_\alpha^{(0)} - u_j^{(0)}) \right)^2 \quad \text{[Equation 13]}$$

$$R(u) = \sum_{j \in N(\alpha)} (h(u_\alpha - u_j) - h(u_\alpha^{(0)} - u_j^{(0)}))^2 \quad \text{[Equation 14]}$$

In this manner, the filter processing unit 240 may operate such that the regularization term defined using the equation 13 or the equation 14 is made to be small. In this case, the filter processing unit 240 may not necessarily limit the update processing to the processing represented in the equation 9 or the equation 10.

In the foregoing description, the method of using the ordinal number (the rank of pixel value) of the α-th pixel in the descending order may have been described as a method in which storing the magnitude relationship between pixel values in a local region as for an input image and a restored image is used as a constraint. However, presently contemplated embodiments are not limited to this implementation.

For example, the filter processing unit 240 may use various types of feature quantities used for object detection or image recognition.

In some instances, the feature quantity may be a local binary pattern (LBP), a local phase quantization (LPQ), a scale-invariant feature transform (SIFT), histograms of oriented gradients (HOG), or a speed up robust feature (SURF). In other instances, the feature quantity may be binary robust independent elementary features (BRIEF) or binary robust invariant scalable keypoints (BRISK). In other instances, the feature quantity may be an oriented-brisk (ORB) or compact and real-time descriptors (CARD).

The filter processing unit 240 may calculate a predetermined feature quantity for every pixel. In some instances, the filter processing unit 240 may provide, using the update processing as represented in the equation 9, a constraint in order to match feature quantities of the input image and the restored image with each other.

In a case where the feature quantity calculated for every pixel is a multidimensional vector, such as the SIFT and the HOG, the filter processing unit 240 may execute the update processing using the equation 9 for every dimension. In a case where the feature quantity is not a binary value, such as the SIFT and the HOG, the filter processing unit 240 may binarize the calculated value after calculating a feature quantity. In a case of a feature quantity such as the LBP and the LPQ in which a binary value calculated in each direction is converted into a multiple-valued value, the filter processing unit 240 may provide a constraint to the input image and the restored image using the binary value before being calculated as the multiple-valued value.

In other aspects, the filter processing unit 240 may update the restored image while applying such a constraint that feature quantities used in image recognition or object detection are matched with each other in the input image and the output image.

The filter processing unit 240 is not limited to employing the method described above as a method of reducing an error (for example, ringing). In other embodiments, the filter processing unit 240 may use another method, for example, other methods that can reduce an error (for example, ringing) generated based on the super resolution processing or the deblurring processing.

The filter processing unit 240 may execute the processing, such as denoising, before updating $u_\alpha^{(k)}$. In other aspects, the information processing apparatus 20 may execute pre-processing in the processing performed by the filter processing unit 240. For example, the filter processing unit 240 may execute the processing using the equation 5 or the equation 6 after executing processing of a bilateral filter or a guided filter with respect to $u_\alpha^{(k)}$. The information processing apparatus 20 may execute the pre-processing using the bilateral filter or the guided filter described above to an edge portion.

In some embodiments, the filter processing unit 240 may determine whether the processed image satisfies a predetermined condition.

If the processed image does not satisfy the condition, the filter processing unit 240 may transmit the output image (provisional restored image) to the variation calculation unit 210 and the error calculation unit 230.

If the processed image satisfies the condition, the filter processing unit 240 may transmit the output image to the image output apparatus 30.

In other aspects, the information processing apparatus 20 may iterate the processing until the update in the filter processing unit 240 satisfies the predetermined condition. The predetermined condition may be a condition set in advance to the information processing apparatus 20. For example, this condition may be that the total sum of differences between pixel values of the image updated in the filter processing unit 240 and pixel values of the image before the update becomes a predetermined threshold value or less. In other aspects, the information processing apparatus 20 may iterate the processing described above until the update amount of the output image satisfies the predetermined condition.

In embodiments in which the information processing apparatus 20 is used for super resolution processing, the output image may be a super resolution image. In embodiments in which the information processing apparatus 20 is used for deblurring processing, the output image may be a deblurred image.

(Description of Operation)

An operation of the information processing apparatus 20 according to one embodiment will be described with reference to the drawings.

Figure 3:
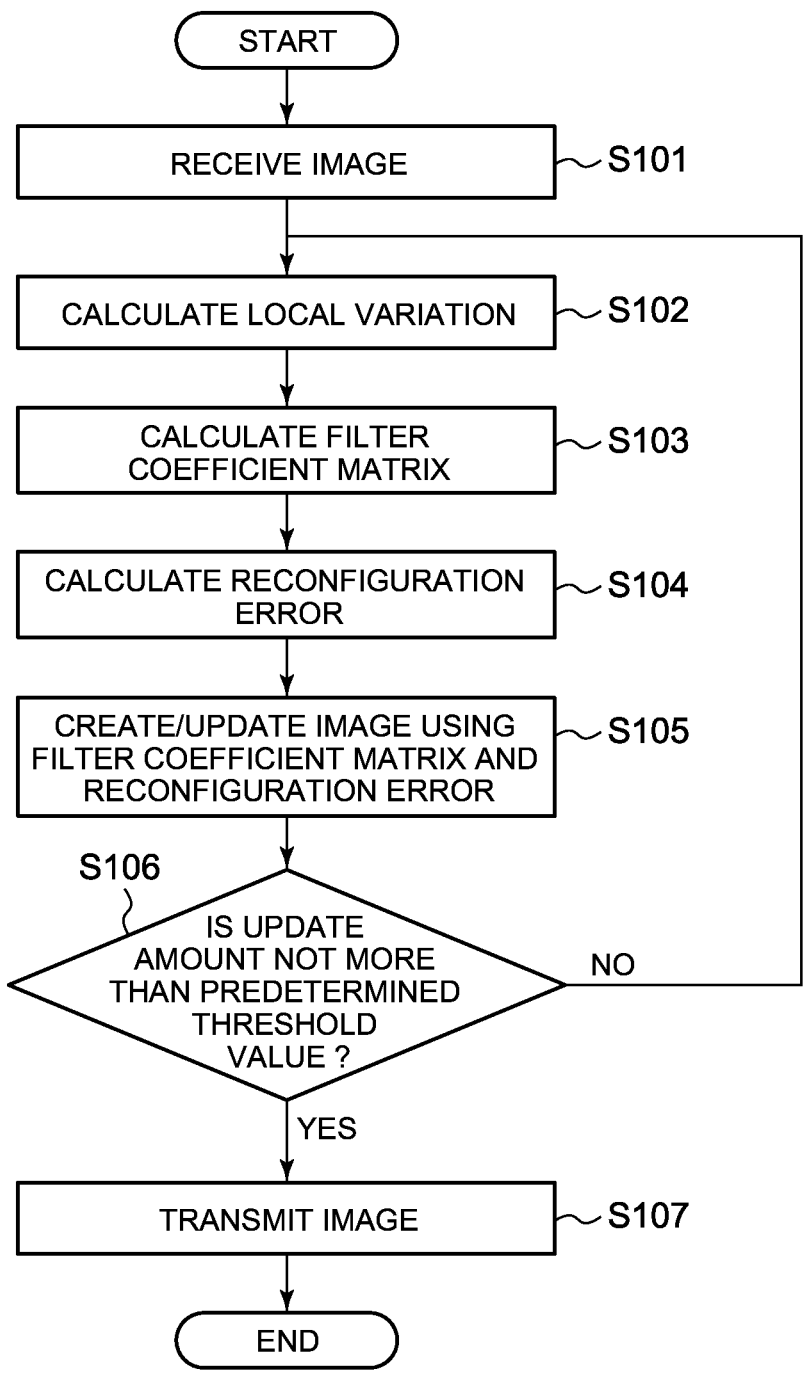
FIG. 3 is a flowchart illustrating an example of an operation of the information processing apparatus according to the first exemplary embodiment.

FIG. 3 is a flowchart illustrating an example of an operation of the information processing apparatus 20 according to one embodiment. In the following description, each element in the information processing apparatus 20 may transmit a calculation result (a calculated value or a created image) to a subsequent component. Meanwhile, each element in the information processing apparatus 20 may store a calculation result in a storage unit. In this case, each element may receive a calculated value or an image from the storage unit.

In Step S101, the information processing apparatus 20 may receive an input image (first degraded image) from the image input apparatus 10. In this process, the information processing apparatus 20 may store the image in the storage unit.

In Step S102, the variation calculation unit 210 may calculate a local variation of each pixel value of the input image (degraded image). In a case of the iterative processing, the variation calculation unit 210 may calculate a local variation using an output image (provisional restored image). The variation calculation unit 210 may use the equation 1 in the calculation of a local variation.

In Step S103, the filter coefficient calculation unit 220 may calculate a filter coefficient matrix using the local variation. The filter coefficient calculation unit 220 may use the equation 2 or the equation 3 in the calculation of a filter coefficient matrix.

In Step S104, the error calculation unit 230 may calculate a reconfiguration error using the input image (degraded image). In a case of the iterative processing, the error calculation unit 230 may calculate a reconfiguration error using an output image (provisional restored image). The error calculation unit 230 may use the equation 4 in the calculation of a reconfiguration error.

However, the processing order between the processing by the variation calculation unit 210 to the filter coefficient calculation unit 220, and the processing by the error calculation unit 230 is not limited to the order described above and may vary depending on the implementation. For example, either processing may be performed first. Alternatively or additionally, in both processing steps, some or all of the operations may be concurrently operated.

In Step S105, the filter processing unit 240 may create an output image using the filter coefficient matrix and the reconfiguration error, and based on the input image. In a case of the iterative processing, the filter processing unit 240 may create a new output image based on a previous output image (provisional restored image). The created output image may be an output image in which the input image or the previous output image is updated.

In Step S106, the filter processing unit 240 may determine an update amount in the updated output image.

If the update amount is not more than a predetermined threshold value (Yes; in Step S106), the filter processing unit 240 may transmit the updated output image (restored image) as an output image to the image output apparatus 30 in Step S107. The information processing apparatus 20 may then finish the processing.

If the update amount is more than the predetermined threshold value (No; in Step S106), the information processing apparatus 20 may cause the processing to return to Step S102, and may iterate the processing.

In Step S106, in a case where the iterative processing is not performed even once, in other words, in a case where the filter processing unit 240 updates the input image, the information processing apparatus 20 may return to Step S102 without determining the update amount.

The information processing apparatus 20 according to the exemplary embodiment may be applicable to degraded-image restoration processing, not limited to the denoising processing for the reasons discussed in more detail below.

The variation calculation unit 210 may calculate a local variation that is a difference between an input image or a previous output image and an output image. The filter coefficient calculation unit 220 may calculate a filter coefficient matrix based on the local variation. In addition to this operation, the information processing apparatus 20 may include the error calculation unit 230. The error calculation unit 230 may calculate a reconfiguration error that is a difference between a second degraded image being degraded and an input image (first degraded image). The filter processing unit 240 may create the output image based on the reconfiguration error in addition to the filter coefficient matrix. Accordingly, the filter processing unit 240 may perform filter processing, i.e., create the output image, based on a difference in the reconfiguration of the output image, in addition to a difference between the input image and the output image. Therefore, the information processing apparatus 20 may create a suitable restored image not only in the denoising processing but also in other image restoration processing (for example, super resolution processing and deblurring processing).

The information processing apparatus 20 may, in some embodiments, reduce a phenomenon termed ringing because the filter processing unit 240 of the information processing apparatus 20 may restore an image in such a manner that a binary pattern in a local region of the input image and a binary pattern in a local region of the restored image are stored.

Modification Example

The information processing apparatus 20 introduced above may be configured as described below.

For example, each constituent unit of the information processing apparatus 20 may be configured as a hardware circuit, or as a combination of hardware and software.

Alternatively or additionally, in the information processing apparatus 20, the respective constituent units may be configured as multiple information processing apparatuses, which are connected to one another via a network or a bus.

For example, in the information processing apparatus 20, the storage unit, in the abovementioned description, may be implemented using an external storage device connected thereto via the network.

Alternatively or additionally, in the information processing apparatus 20, multiple constituent units may be configured as a single hardware unit, or as a combination of hardware and software.

Alternatively or additionally, the information processing apparatus 20 may be implemented as a computer apparatus including a central processing unit (CPU), a read only memory (ROM), and/or a random access memory (RAM). The information processing apparatus 20 may be implemented as a computer apparatus including, in addition to the above-mentioned configuration, an input-output connection circuit (IOC: Input Output Circuit) and/or a network interface circuit (NIC: Network Interface Circuit).

Figure 4:
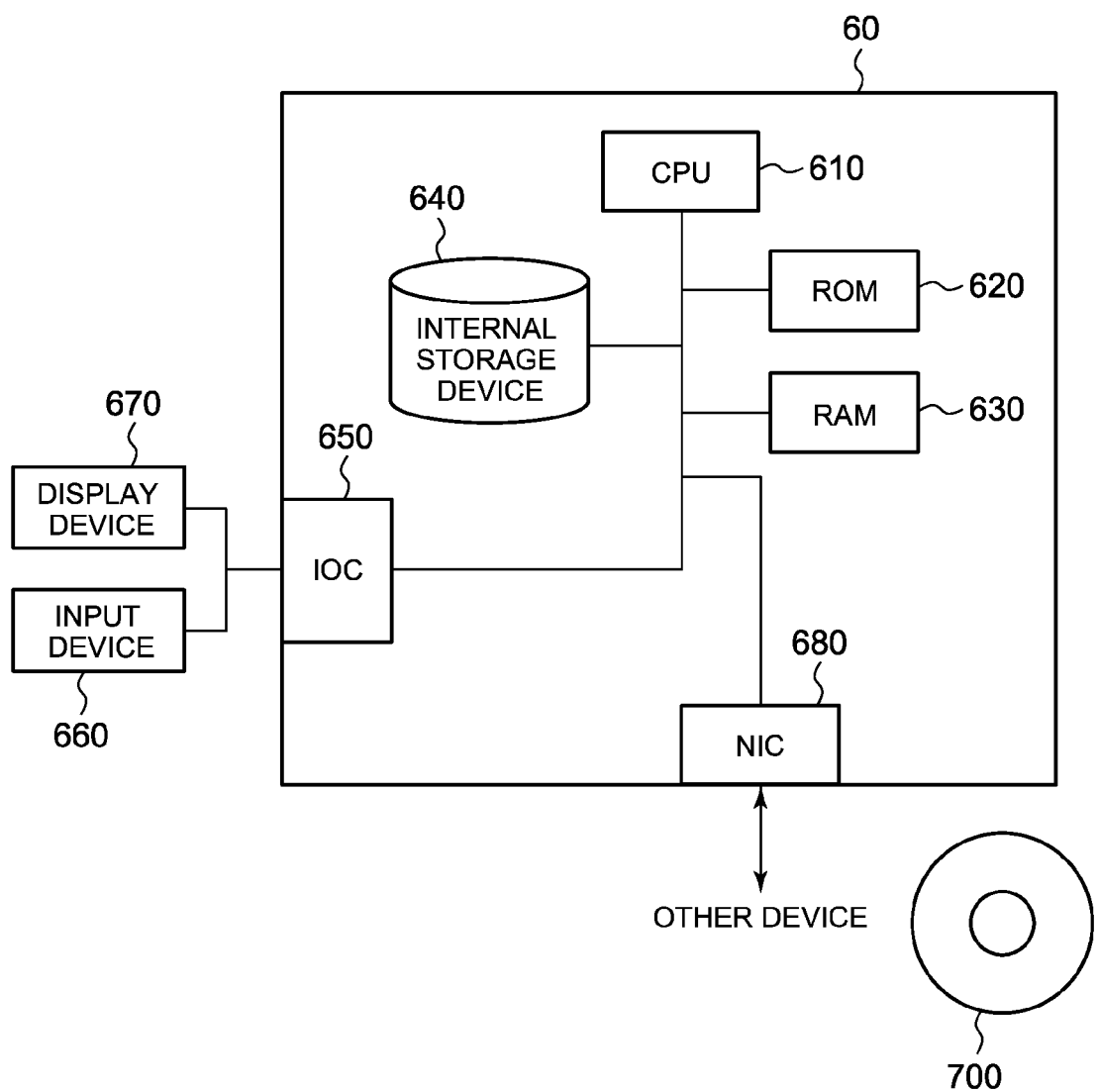
FIG. 4 is a block diagram illustrating an example of the configuration of an information processing apparatus in a modification example according to the first exemplary embodiment.

FIG. 4 is a block diagram illustrating an example of one possible configuration of an information processing apparatus 60 in the modification example according to one embodiment.

The information processing apparatus 60 may include a computer having a CPU 610, a ROM 620, a RAM 630, an internal storage device 640, an IOC 650, and/or an NIC 680.

The CPU 610 may read a program from the ROM 620. The CPU 610 may control the RAM 630, the internal storage device 640, the IOC 650, and the NIC 680 based on the read program. The computer, including the CPU 610, may control these configurations, and implement the respective functions as the variation calculation unit 210, the filter coefficient calculation unit 220, the error calculation unit 230, and the filter processing unit 240 illustrated in FIG. 2. The CPU 610 may use, when implementing the respective functions, the RAM 630 or the internal storage device 640 to temporarily store the program.

The CPU 610 may read a program included in a computer readable storage medium 700 in which programs are stored using a storage medium reading device. Alternatively or additionally, the CPU 610 may receive a program from an external device, via the NIC 680. The CPU 610 may store the read program or the received program in the RAM 630, and operate based on the program stored in the RAM 630.

The ROM 620 may store programs that the CPU 610 executes, as well as a variety of types of other stored or fixed data. For example, the ROM 620 may be a programmable-rom (P-ROM) or a flash ROM.

The RAM 630 may temporarily store programs that the CPU 610 executes and/or other data. For example, the RAM 630 may be a dynamic-ram (D-RAM).

The internal storage device 640 may store data and programs that the information processing apparatus 60 stores over a long term. The internal storage device 640 may operate as a temporary storage device for the CPU 610. For example, the internal storage device 640 may be a hard disk device, a magneto-optical disk device, a solid state drive (SSD), or a disk array device.

The ROM 620 and the internal storage device 640 may be nonvolatile storage media. The RAM 630 may be a volatile storage medium. The CPU 610 may operate based on the program stored in the ROM 620, the internal storage device 640, or the RAM 630. In other aspects, the CPU 610 may operate using the nonvolatile storage medium or the volatile storage medium.

The IOC 650 may transfer data between the CPU 610, and an input device 660 and a display device 670. For example, the IOC 650 may be an IO interface card or a universal serial bus (USB) card.

The input device 660 may be a device that receives an input instruction from an operator of the information processing apparatus 60. For example, the input device 660 may be a key board, a mouse, or a touch panel.

The display device 670 may be a device that displays information to the operator of the information processing apparatus 60. For example, the display device 670 may be a liquid crystal display.

The NIC 680 may relay data transferring to other configurations via the network. For example, the NIC 680 may be a local area network (LAN) card or a peripheral component interconnect (PCM) card.

The information processing apparatus 60 configured in this manner may obtain an effect similar to that of the information processing apparatus 20 because the CPU 610 of the information processing apparatus 60 may implement, based on the program, the functions similar to that of the information processing apparatus 20.

The input device 660 may operate to perform the functions previously described for the image input apparatus 10 illustrated in FIG. 1. Display device 670 may implement the functions via the image output apparatus 30 illustrated in FIG. 1. In this case, the information processing apparatus 60 illustrated in FIG. 4 can implement the functions via the information processing system 40 illustrated in FIG. 1.

Second Exemplary Embodiment

An information processing apparatus 21 according to a second exemplary embodiment will be described with reference to the drawings.

(Description of Configuration)

A configuration of the information processing apparatus 21 consistent with one embodiment will be described.

Figure 5:
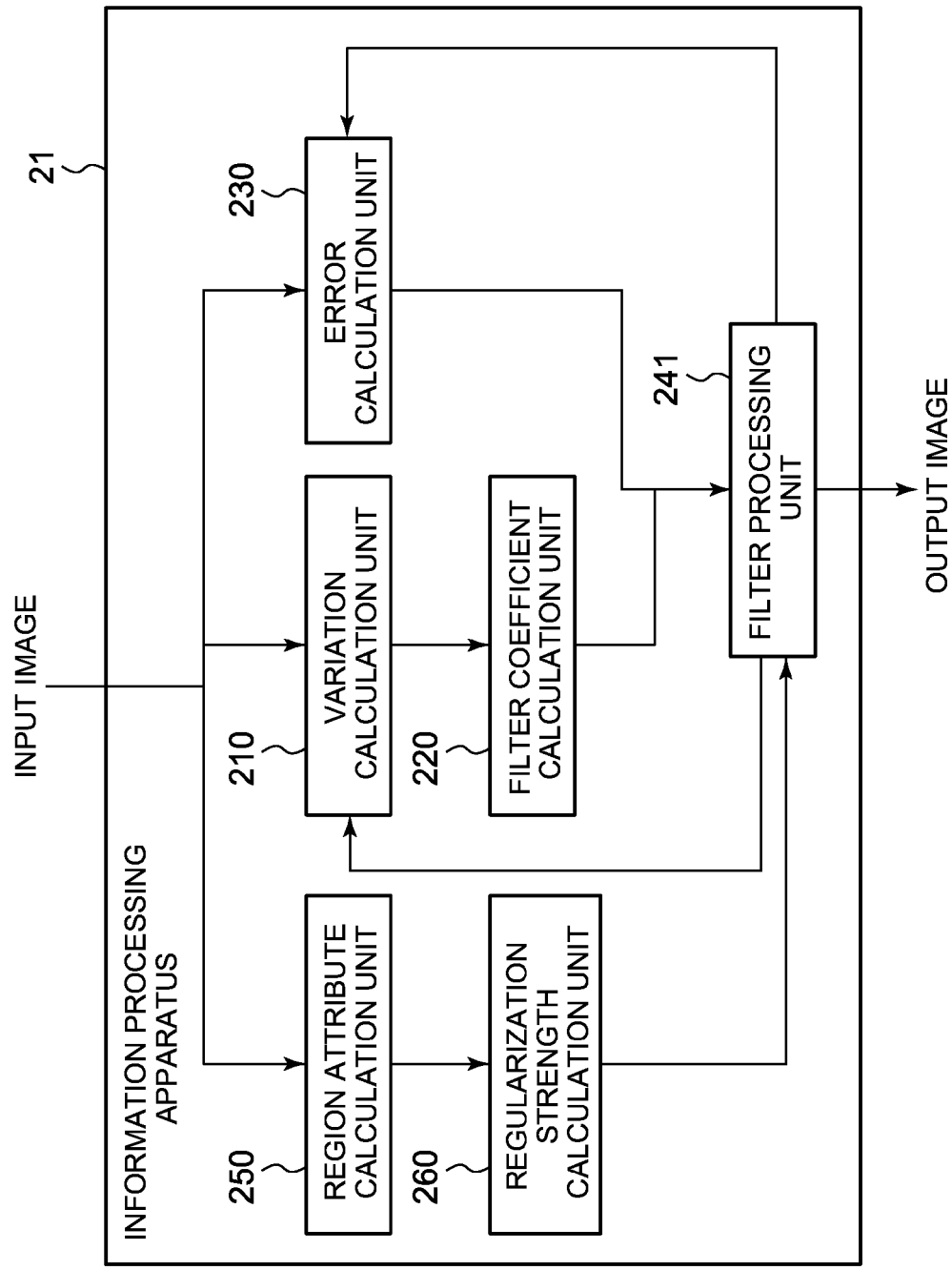
FIG. 5 is a block diagram illustrating an example of the configuration of an information processing apparatus according to a second exemplary embodiment.

FIG. 5 is a block diagram illustrating an example of the configuration of the information processing apparatus 21 according to the second exemplary embodiment. The similar components in FIG. 5 to those in FIG. 1 may be denoted by the same reference numerals.

The information processing apparatus 21 may receive an input image from the image input apparatus 10 and transmit an output image to the image output apparatus 30, similar to the information processing apparatus 20.

As illustrated in FIG. 5, the information processing apparatus 21 according to the embodiment may include the variation calculation unit 210, the filter coefficient calculation unit 220, the error calculation unit 230, a filter processing unit 241, a region attribute calculation unit 250, and a regularization strength calculation unit 260.

The information processing apparatus 21 may store an input image and/or an output image in a storage unit. For example, the information processing apparatus 21 may receive an input image from the image input apparatus 10, and after storing the input image in the storage unit, execute an operation described below. Alternatively and additionally, the information processing apparatus 21 may execute the operation described below, and after storing an output image in the storage unit, transmit the stored output image to the image output apparatus 30.

The information processing apparatus 21 may be implemented using the computer illustrated in FIG. 4, similar to the first exemplary embodiment.

The variation calculation unit 210, the filter coefficient calculation unit 220, and the error calculation unit 230, which are illustrated in FIG. 5, may be similar to those in the first exemplary embodiment. In the following description, differences between the present embodiment and the first exemplary embodiment will be described with the understanding that features common to both embodiments may operate similarly in many implementations.

Based on gradient values of pixel values (for example, luminance value) of an input image (degraded image), the region attribute calculation unit 250 may calculate a value (hereinafter, represented as "region attribute value") representing a possibility that each pixel in the input image (degraded image) belongs to an edge region, a flat region, and a texture region.

The "region attribute value" may contain three values corresponding to the edge region, the flat region, and the texture region in each pixel. For example, in a case where a region attribute value of the edge region is set as "$S_e$", a region attribute value of the flat region is set as "$S_e$", and a region attribute value of the texture region is set as "$S_t$", the region attribute value may be data represented as "($S_e$, $S_e$, $S_t$)".

The region attribute calculation unit 250 in the description may calculate a region attribute value using a degraded image. A calculation method of a region attribute value is not necessarily limited to the operation having been described in the foregoing. For example, the region attribute calculation unit 250 may calculate a region attribute value using an output image (provisional restored image) created by the filter processing unit 241 described below.

The "edge region" may be a region in which a luminance gradient value of pixels in a specific direction is large, and directions with large luminance gradient values are approximately aligned. Examples of methods of obtaining the edge region include the following method. The region attribute calculation unit 250 may extract a set of luminance gradient values from a predetermined region. The region attribute calculation unit 250 may extract a set of sampled luminance gradient values.

The region attribute calculation unit 250 may use a main component analysis to calculate a first main component and a second main component in the extracted set. The region attribute calculation unit 250 may calculate a ratio of a luminance gradient value of the first main component and a luminance gradient value of the second main component. The larger ratio may indicate a high possibility that the region may be an edge region. Therefore, the region attribute calculation unit 250 may calculate a value corresponding to the ratio as a region attribute value "$S_e$" of the edge region of the pixel included in the region.

The "texture region" may be a region in which a luminance gradient value of the pixel is large, and directions with large luminance gradient values are not aligned. Examples of methods of obtaining the texture region include the following method. Similar to the above, the region attribute calculation unit 250 may extract a set of sampled luminance gradient values from a predetermined region. The region attribute calculation unit 250 may use a main component analysis to calculate a first main component and a second main component of the luminance gradient value in the extracted set. The region attribute calculation unit 250 may calculate the magnitude of each main component, and a ratio of the first main component and the second main component. The larger absolute value of each main component and the ratio being closer to 1 may indicate a higher possibility that the region is a texture region. Therefore, the region attribute calculation unit 250 may calculate a value corresponding to the absolute value of the main component and the ratio, as a region attribute value "$S_t$" of texture region of the pixel included in the region. In other aspects, the region attribute calculation unit 250 may calculate a value of the region attribute value "$S_t$" of the texture region so as to become larger as the absolute value of the main component is larger and become larger as the ratio is closer to 1.

The "flat region" may be a region in which a luminance gradient value is small. The flat region may include regions in which luminance gradient directions are aligned and not aligned. In some cases, the luminance gradient direction cannot be obtained in the flat region because no significant difference between an error and a difference value of the components of the luminance gradient value is present. Therefore, the region attribute calculation unit 250 may calculate a main component in a set of sampled luminance gradient values, for example. The region attribute calculation unit 250 may calculate a larger value as a region attribute value "$S_s$" in the flat region as both of the magnitude of the first main component and the magnitude of the second main component are smaller.

The method of calculating a region attribute value by the region attribute calculation unit 250 is not necessarily limited to the method in the foregoing description. For example, the region attribute calculation unit 250 may use a learning function. For example, the region attribute calculation unit 250 may receive a high resolution image for learning, and create an image in which the high resolution image for learning is degraded. The region attribute calculation unit 250 may receive, for each pixel of the degraded image, teacher data of a region attribute value representing the extent of the region attribute value. The region attribute calculation unit 250 may learn a function of obtaining a region attribute value based on the degraded image and the teacher data, using a predetermined analysis method (for example, regression analysis).

The value calculated by the region attribute calculation unit 250 is not necessarily limited to the first main component and the second main component based on the main component analysis. For example, in some embodiments, the region attribute calculation unit 250 may calculate, as an amount for determining which of the edge region, the texture region, or the flat region is the region of each pixel, a luminance gradient angle from a set of sampled luminance gradients in a given region.

The region attribute calculation unit 250 may transmit the calculated region attribute value to the regularization strength calculation unit 260.

The regularization strength calculation unit 260 may calculate the strength of the regularization term (hereinafter, represented as "regularization strength $\Lambda_\alpha$") for every pixel based on the region attribute value calculated by the region attribute calculation unit 250. In some instances, the regularization strength calculation unit 260 may calculate regularization strength $\Lambda_\alpha$ acting so as to suppress pixel values in a region where lowering of the pixel values (for example, gradation of luminance values) is suppressed. For example, in a case where low gradation in a texture region is intended to be suppressed, the regularization strength calculation unit 260 may calculate regularization strength $\Lambda_\alpha$ as described below. In other aspects, the regularization strength $\Lambda_\alpha$ may be a value which becomes smaller, in a pixel $\alpha$, as a region attribute value $S_t$ in the texture region is larger. The regularization strength $\Lambda_\alpha$ may be a value which becomes smaller as a region attribute value $S_e$ in the edge region is smaller. The regularization strength $\Lambda_\alpha$ may be a value which becomes smaller, in a pixel $\alpha$, as a region attribute value $S_s$ in the flat region is smaller. The regularization strength $\Lambda_\alpha$ may be a value corresponding not only to all three of the region attribute value $S_s$ in the flat region, the region attribute value $S_e$ in the edge region, and the region attribute value $S_t$ in the texture region but also to any one or two of the region attribute values.

A specific calculation method of the regularization strength $\Lambda_\alpha$ in the regularization strength calculation unit 260 is not limited to the embodiment described above. For example, in advance, a user of the information processing apparatus 21 may define a function using a region attribute value as an argument to the regularization strength calculation unit 260. Alternatively or additionally, the information processing apparatus 21 may determine a calculation method (function) of the regularization strength $\Lambda_\alpha$ using machine learning. For example, the information processing apparatus 21 may store an exponential function or a sigmoid function in which the regularization strength $\Lambda_\alpha$ is modeled, and determine (calculate) a function that appropriately fits this model to a region attribute value calculated based on learning data prepared in advance. Hereinafter, "determining a function" or "determining a parameter of a function" may also be represented as "calculating a function".

Alternatively or additionally, the regularization strength calculation unit 260 may use a distribution function related to a luminance gradient strength, which may be calculated using learning data prepared in advance. In some instances, the regularization strength calculation unit 260 may create, as a region attribute value, a set of luminance gradients sampled in a given region for every pixel from learning data. The regularization strength calculation unit 260 may apply a main component analysis to the set, and calculate a first main component, a second main component, and a mean value of angles of luminance gradient. Hereinafter, the first main component, the second main component, and the mean value of angles of luminance gradient in the α-th pixel may be respectively set as "$\xi_1^\alpha$", "$\xi_2^\alpha$", and "$\theta^\alpha$".

The regularization strength calculation unit 260 may calculate a gradient strength for every pixel. Hereinafter, a luminance gradient strength in the α-th pixel may be referred to as "$|\nabla_\alpha^u|$".

For example, the regularization strength calculation unit 260 may calculate a distribution of the gradient strengths for every group of region attribute values. In other aspects, the regularization strength calculation unit 260 may calculate a conditional probability distribution "$P(|\nabla_u||\xi_1, \xi_2, \theta) = f(|\nabla_u|)$", based on region attribute value $s(\xi_1, \xi_2, \theta)$ and luminance gradient strengths $(|\nabla_u|)$ obtained from all the pixels in all the learning images. For example, the regularization strength calculation unit 260 may set "$f(|\nabla_u|)$" to "$\exp(-\Lambda(|\nabla_u|)^p)$". The regularization strength calculation unit 260 may calculate the conditional probability distribution based on the sample of the learning image, using "Λ" and "p" as functions using "$\xi_1, \xi_2, \theta$" as arguments. Alternatively or additionally, the regularization strength calculation unit 260 may receive either one or both of "Λ" and "p" from a device that the user of the information processing apparatus 20 operates.

In this manner, the regularization strength calculation unit 260 may determine, as "Λ" and "p", a function "$\Lambda(\xi_1, \xi_2, \theta)$" and a function "$p(\xi_1, \xi_2, \theta)$", which use $\xi_1, \xi_2,$ and $\theta$ as arguments.

The function "$p(\xi_1, \xi_2, \theta)$" described herein may correspond to "p" of "$L_p$ norm" in the description of the equation 2 or the equation 3. In other aspects, "γ" and "p" in the equation 2 or the equation 3 may have a relation of "$\gamma = 2 - p(\xi_1, \xi_2, \theta)$". In other aspects, the operation of the regularization strength calculation unit 260 described in the foregoing may indicate that, in a case where the regularization term is represented as "$L_p$ norm", a value of "p" of the $L_p$ norm may be changed for every pixel using the learning image.

The regularization strength calculation unit 260 may calculate the regularization strength using the obtained function $\iota(\xi_1, \xi_2, \theta)$ and the function $p(\xi_1, \xi_2, \theta)$. In other aspects, the regularization strength calculation unit 260 may calculate $\Lambda_\alpha = \Lambda(\xi_1^\alpha, \xi_2^\alpha, \theta^\alpha)$ and $p_\alpha = p(\xi_1^\alpha, \xi_2^\alpha, \theta^\alpha)$, based on the first main component, the second main component, and the mean value of angles $(\xi_1^\alpha, \xi_2^\alpha, \downarrow^\alpha)$ in the α-th pixel of the input image.

In the embodiment described above, the regularization strength calculation unit 260 may calculate regularization strength for every pixel. However, the regularization strength calculation unit 260 is not limited to operating in the manner described above and may vary depending upon the implementation. For example, the regularization strength calculation unit 260 may calculate regularization strength for a set of neighboring pixels. In other aspects, the regularization strength calculation unit 260 may calculate regularization strength (for example, $\Lambda_{\alpha\beta}$) between a certain pixel (for example, pixel α) and a neighboring pixel thereof (for example, pixel β). In other aspects, for each of the pixels positioned above and below the certain pixel α and to the left and right (or slant) of the certain pixel α, the regularization strength calculation unit 260 may separately calculate a distribution function (arguments are similarly, $\xi_1, \xi_2$ and $\theta$) related to the luminance gradient using, for example, the method described above. The regularization strength calculation unit 260 may calculate regularization strength based on the calculated distribution function.

For example, when pixels positioned above and below the pixel α, to the left and right of the pixel α and slant to the pixel α are respectively set as "$\beta_1, \beta_2, \beta_3, \beta_4, \ldots$", the regularization strength calculation unit 260 may calculate probability distribution functions of these pixels according to the following equation 15.

$$P_{\beta 1}(|\nabla u||\xi_1,\xi_2,\theta)=\exp(-\Lambda_{\beta 1}|\nabla u|^{P\beta 1}) \quad \text{[Equation 18]}$$

$$P_{\beta 2}(|\nabla u||\xi_1,\xi_2,\theta)=\exp(-\Lambda_{\beta 2}|\nabla u|^{P\beta 2})$$

$$P_{\beta 3}(|\nabla u||\xi_1,\xi_2,\theta)=\exp(-\Lambda_{\beta 3}|\nabla u|^{P\beta 3})$$

$$P_{\beta 4}(|\nabla u||\xi_1,\xi_2,\theta)=\exp(-\Lambda_{\beta 4}|\nabla u|^{P\beta 4}) \ldots$$

In this manner, similar to the above, the regularization strength calculation unit 260 may calculate $\Lambda_{\beta 1}$ and $P_{31}$ and similar variables as a function $\Lambda_{\beta 1}(\xi_1, \xi_2, \theta)$ and a function $p_{\beta 1}(\xi_1, \xi_2, \theta)$, and similar variables using $\xi_1, \xi_2,$ and $\theta$ as arguments. Based on the first main component, the regularization strength calculation unit 260 may calculate the second main component, and the mean value of angles ($\xi_1^\alpha, \xi_2^\alpha, \theta^\alpha$) in the α-th pixel of the input image, and a regularization strength between the α-th pixel and the β-th pixel, as follows:

(1) if the pixel β1 is positioned above the pixel α, $\Lambda_{\alpha\beta}=\Lambda_{\beta 1}(\xi_1^\alpha, \xi_2^\alpha, \theta^\alpha)$, $p_{\alpha\beta}=p_{\beta 1}(\xi_1^\alpha, \xi_2^\alpha, \theta^\alpha)$;
(2) if the pixel $\beta_2$ is positioned below the pixel α, $\Lambda_{\alpha\beta}=\Lambda_{\beta 2}(\xi_1^\alpha, \xi_2^\alpha, \theta^\alpha)$, $p_{\alpha\beta}=p_{\beta 2}(\xi_1^\alpha, \xi_2^\alpha, \theta^\alpha)$;
(3) if the pixel $\beta_3$ is positioned to the left of the pixel α, $\Lambda_{\alpha\beta}=\Lambda_{\beta 3}(\xi_1^\alpha, \xi_2^\alpha, \theta^\alpha)$, $p_{\alpha\beta}=p_{\beta 3}(\xi_1^\alpha, \xi_2^\alpha, \theta^\alpha)$;
(4) if the pixel $\beta_4$ is positioned to the right of the pixel α, $\Lambda_{\alpha\beta}=\Lambda_{\beta 4}(\xi_1^\alpha, \xi_2^\alpha, \theta^\alpha)$, $p_{\alpha\beta}=p_{\beta 4}(\xi_1^\alpha, \xi_2^\alpha, \theta^\alpha)$; and
(5) similar equations derived from those set forth in (1)-(4) may be applied to perform the calculations for the pixels located in the slant directions.

In this manner, the regularization strength calculation unit 260 may calculate regularization strength between pixels. The regularization strength calculation unit 260 may store the calculated regularization strength in a storage unit (memory).

The region attribute calculation unit 250 and the regularization strength calculation unit 260 may operate in a similar manner for a target region that is different from the above-mentioned three regions.

The filter processing unit 241 may create an output image based on the regularization strength $\Lambda_\alpha$ calculated by the regularization strength calculation unit 260, in addition to the output image (provisional restored image) after being iteration processed, the filter coefficient matrix, and the reconfiguration error, which are similar to the first embodiment. In some instances, the filter processing unit 241 may create components of the image after the k+1 iterations based on a linear sum of a value calculated using an image and values represented below similar to the first exemplary embodiment and the regularization strength $\Lambda_\alpha$.

The image and the values, as similar to the first exemplary embodiment, are as follows:
(1) an output image (provisional restored image) which is obtained after the k iterations;
(2) a filter coefficient matrix calculated by the filter coefficient calculation unit 220; and
(3) a reconfiguration error calculated by the error calculation unit 230.

Similar to the first exemplary embodiment, a calculation method in the filter processing unit 241 is not limited to the embodiment described above and is subject to a variety of implementation-specific variations. For example, the filter processing unit 241 may use filter calculation represented in an equation 16 or an equation 17.

$$u_\alpha^{(k+1)} = \frac{1}{\mu + \Lambda_\alpha \sum_\gamma W_{\alpha\gamma}} \left[ \mu u_\alpha^{(k)} - \mu d_\alpha + \Lambda_\alpha \sum_{\gamma \neq \alpha} W_{\alpha\gamma} u_\gamma^{(k)} \right] \quad \text{[Equation 16]}$$

$$u_\alpha^{(k+1)} = u_\alpha^{(k)} - \tau \left[ \mu d_\alpha + \Lambda_\alpha \sum_{\gamma \neq \alpha} W_{\alpha\gamma} u_\gamma^{(k)} \right]. \quad \text{[Equation 17]}$$

In the equation 16 and the equation 17, "µ" may be a parameter to adjust the intensity of TV regularization. "τ" may be a parameter to represent the magnitude of the update amount, and may be determined by the user in advance. The filter processing unit 241 may store µ in advance prior to the processing. For example, the filter processing unit 241 may receive a value of µ in advance from a device that the user uses.

For example, in a case of calculating regularization strength $\Lambda_{\alpha\beta}$ between pixels, the regularization strength calculation unit 260 may execute filter calculation as represented in the following equation 18 or equation 19.

$$u_\alpha^{(k+1)} = \frac{1}{\mu + \sum_\gamma \Lambda_{\alpha\gamma} W_{\alpha\gamma}} \left[ \mu u_\alpha^{(k)} - \mu d_\alpha + \sum_{\gamma \neq \alpha} \Lambda_{\alpha\gamma} W_{\alpha\gamma} u_\gamma^{(k)} \right] \quad \text{[Equation 18]}$$

$$u_\alpha^{(k+1)} = u_\alpha^{(k)} - \tau \left[ \mu d_\alpha + \sum_{\gamma \neq \alpha} \Lambda_{\alpha\gamma} W_{\alpha\gamma} u_\gamma^{(k)} \right] \quad \text{[Equation 19]}$$

(Description of Operation)

An operation of the information processing apparatus 21 according to one embodiment will be described with reference to the drawings.

Figure 6:
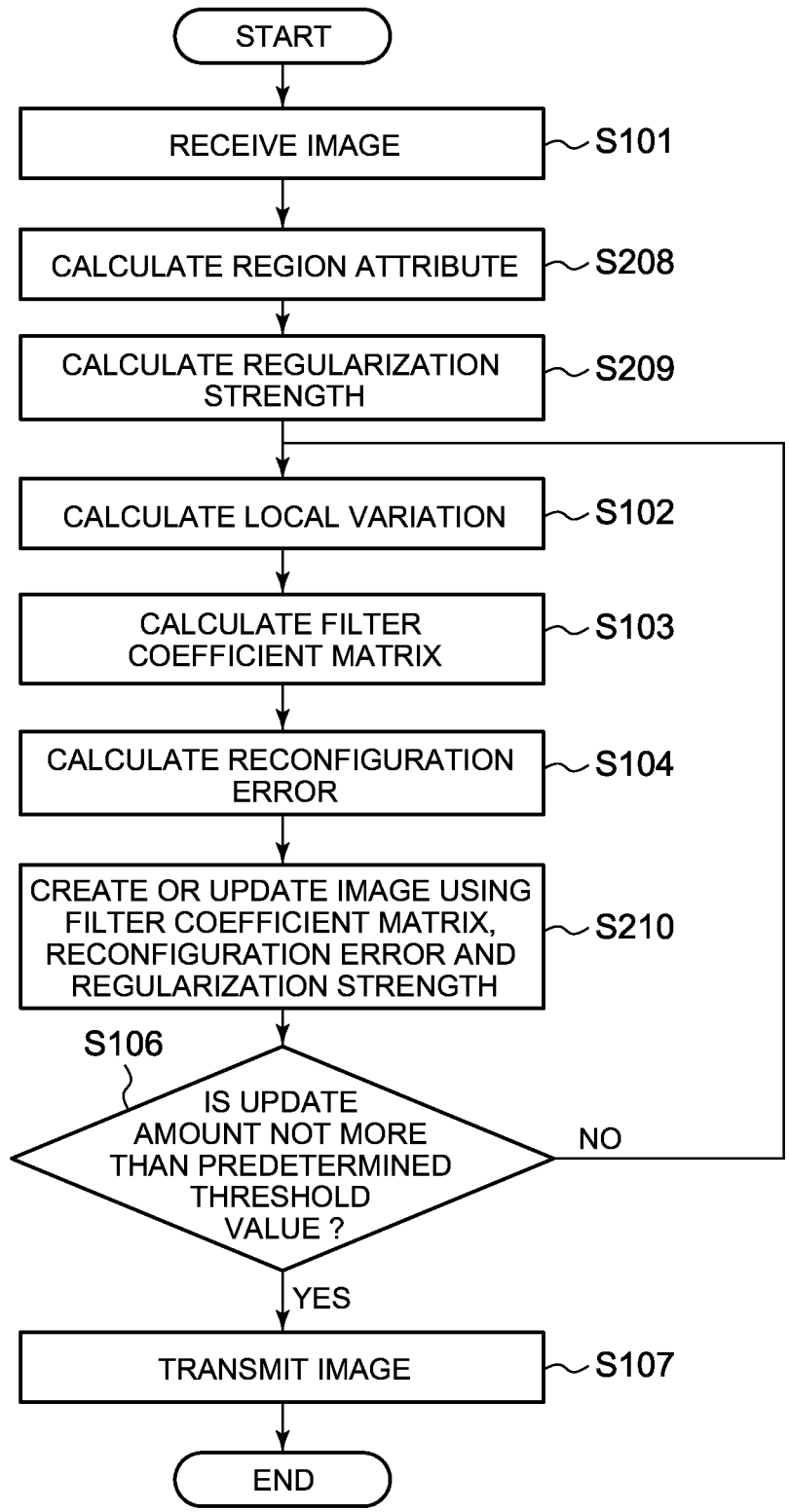
FIG. 6 is a flowchart illustrating an example of an operation of the information processing apparatus according to the second exemplary embodiment.
Figure 7:
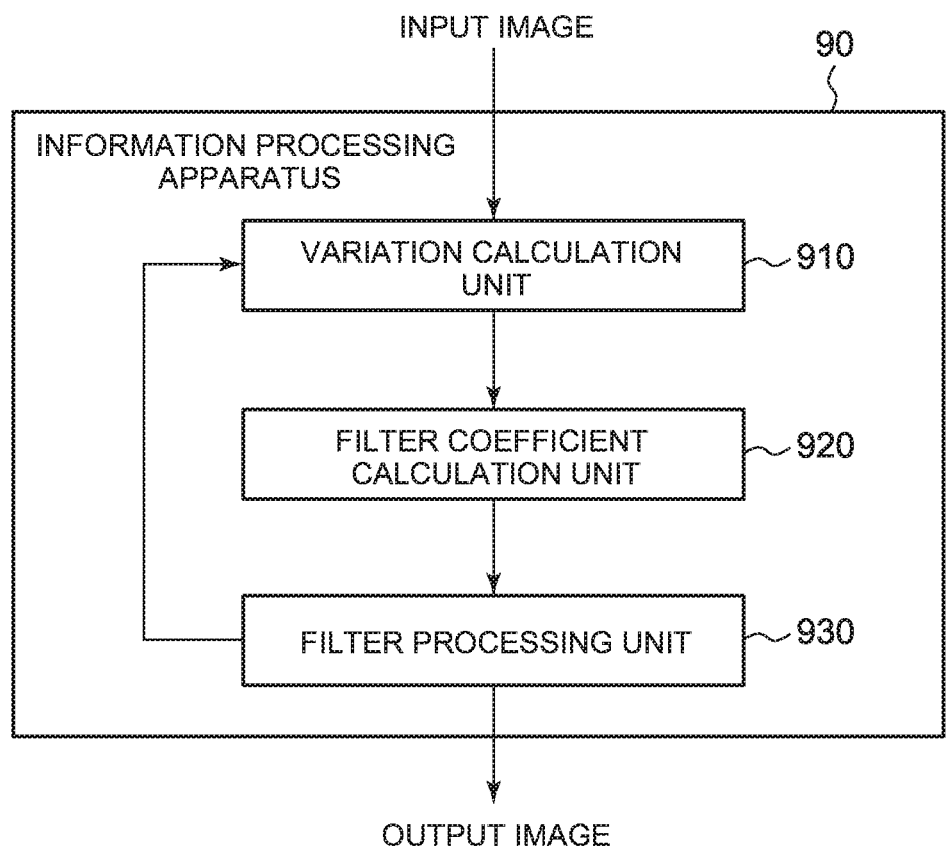
FIG. 7 is a block diagram illustrating an example of the configuration of an information processing apparatus related to the present disclosure.

FIG. 6 is a flowchart illustrating an example of the operation of the information processing apparatus 21. The similar operations in FIG. 6 to those in FIG. 3 are denoted by the same reference numerals.

In the following description, each component in the information processing apparatus 21 may transmit a calculation result (a calculated value or a created image) to a subsequent component. Each component in the information processing apparatus 21 may store a calculation result in the storage unit. In this case, each component may take out a calculated value or an image from the storage unit.

In Step S101, the information processing apparatus 21 may receive an input image (first degraded image) from the image input apparatus 10. In this process, the information processing apparatus 21 may store the image in the storage unit.

In Step S208, the region attribute calculation unit 250 may calculate a region attribute value for every pixel based on the received input image (degraded image).

In Step S209, the regularization strength calculation unit 260 may calculate regularization strength for every pixel based on the region attribute value.

In Step S102, the variation calculation unit 210 may calculate a local variation of each pixel value of the input image (degraded image) or an output image (provisional restored image). The variation calculation unit 210 may use the equation 1 in the calculation of a local variation.

In Step S103, the filter coefficient calculation unit 220 may calculate a filter coefficient matrix based on the local variation. The filter coefficient calculation unit 220 may use the equation 2 or the equation 3 in the calculation of a filter coefficient matrix.

In Step S104, the error calculation unit 230 may calculate a reconfiguration error using the input image (degraded image) or the output image (provisional restored image).

The error calculation unit 230 may use the equation 4 in the calculation of a reconfiguration error.

As in the first exemplary embodiment, the order of the processing of the variation calculation unit 210 to the filter coefficient calculation unit 220, and the processing by the error calculation unit 230 is not limited to the processing order in the embodiment described above. Similarly, the processing by the region attribute calculation unit 250 and the processing by the regularization strength calculation unit 260 are not limited in terms of the order of other operations. Indeed, the order of the processing operations described above may vary in other embodiments.

In Step S210, the filter processing unit 241 may create or update the output image using the filter coefficient matrix, the reconfiguration error, and the regularization strength. The filter processing unit 241 may use the equation 16 or the equation 17 in the update of the image.

In Step S106, the filter processing unit 241 may determine an update amount in the updated image.

If the update amount is not more than a predetermined threshold value (Yes; in Step S106), the filter processing unit 241 may transmit the created or updated image as an output image to the image output apparatus 30 in Step S107. Further, the information processing apparatus 21 may finish the processing.

If the update amount is more than the predetermined threshold value (No; in Step S106), the information processing apparatus 21 may cause the processing to return to Step S102, and iterate the processing.

Further, in Step S106, in a case where the filter processing unit 241 newly creates an output image, the information processing apparatus 21 may omit the determination in Step S106, cause the processing to return to Step S102, and iterate the processing.

As described below, the information processing apparatus 21 according to one embodiment may obtain an effect capable of reducing the low gradation in a predetermined region (for example, the texture region), in addition to the effects obtained via operation of the first exemplary embodiment, as described above.

The information processing apparatus 21 may include the region attribute calculation unit 250 and the regularization strength calculation unit 260 in addition to the configuration of the information processing apparatus 20 in the first exemplary embodiment, and may include the filter processing unit 241 in place of the filter processing unit 240. The region attribute calculation unit 250 may calculate a region attribute value representing a possibility that a given pixel is of a predetermined region. For example, based on the magnitude of a luminance gradient value and the extent of similarity of luminance gradient values, the region attribute calculation unit 250 may calculate a region attribute value "$S_t$" in a texture region representing a possibility that a given pixel is of the texture region. The regularization strength calculation unit 260 may calculate regularization strength of a pixel based on the region attribute value. The filter processing unit 241 may create an output image using the regularization strength, in addition to the filter coefficient matrix and the reconfiguration error. Therefore, the filter processing unit 241 may create an output image in which the gradation in the predetermined region (for example, the edge region, the flat region, or the texture region) is prevented from lowering.

In the foregoing, the disclosure of the present application has been described with reference to some embodiments of the disclosure; however, the disclosure of the present application is not limited to the above-mentioned embodiments.

Various modifications that could be understood by those skilled in the art may be made to the configuration and the details of the disclosure of the present application within the scope of the disclosure of the present application.

The invention claimed is:

1. An information processing apparatus, comprising:
a memory storing instructions; and
at least one processor configured to process the instructions to:
receive an input image,
calculate a local variation of a first pixel in the input image based on a difference in pixel value between the first pixel and a surrounding pixel of the first pixel,
calculate, based on gradient values for pixel values of the input image, a region attribute value associated with each pixel of the input image, wherein the region attribute value indicates a likelihood that a pixel belongs to a predetermined region in the input image,
calculate, based on the region attribute value, a regularization strength for each pixel of the input image,
calculate a filter coefficient for suppressing a variation between neighboring pixels in the input image based on the local variation and on the regularization strength,
create a second image by degrading the input image,
calculate a reconfiguration error between the input image and the second image, and
create a first provisional image based on the filter coefficient and the reconfiguration error.

2. The information processing apparatus according to claim 1, wherein the at least one processor is configured to process the instructions to:
create the first provisional image using a linear combination of an amount by which pixel values of the input image are processed using the filter coefficient, the pixel values of the input image, and the reconfiguration error.

3. The information processing apparatus according to claim 1, wherein the at least one processor is configured to process the instructions to:
create the second image by at least one of decreasing a resolution of the input image and blurring the input image.

4. The information processing apparatus according to claim 1, wherein the at least one processor is configured to process the instructions to:
calculate the regularization strength for each pixel of the input image based on at least one of a first main component, a second main component, and a mean value of angles of a gradient value for the pixel value of each pixel in a local region of the input image, wherein the first main component, the second main component, and the mean value are each calculated using a main component analysis on the gradient value.

5. The information processing apparatus according to claim 1, wherein the at least one processor is configured to process the instructions to:
execute filter processing such that an order of magnitude of pixel values of a plurality of pixels surrounding the first pixel in the input image is the same as an order of magnitude of pixel values of a plurality of pixels surrounding a second pixel in an output image, wherein the first pixel corresponds to the second pixel.

6. The information processing apparatus according to claim 1, wherein the at least one processor is configured to process the instructions to:
determine a second filter coefficient and a second reconfiguration error based on the first provisional image,
create a second provisional image based on the second filter coefficient and the second reconfiguration error,
determine a difference between the first and second provisional images; and
provide the second provisional image as an output image when the difference between the first and second provisional images satisfies a predetermined condition.

7. An information processing system comprising:
an information processing apparatus, comprising:
a memory storing instructions; and
at least one processor configured to process the instructions to:
receive an input image,
calculate a local variation of a first pixel in the input image based on a difference in pixel value between the first pixel and a surrounding pixel of the first pixel,
calculate, based on gradient values for pixel values of the input image, a region attribute value associated with each pixel of the input image, wherein the region attribute value indicates a likelihood that a pixel belongs to a predetermined region in the input image,
calculate, based on the region attribute value, a regularization strength for each pixel of the input image,
calculate a filter coefficient for suppressing a variation between neighboring pixels in the input image based on the local variation and on the regularization strength,
create a second image by degrading the input image,
calculate a reconfiguration error between the input image and the second image, and
create a first provisional image based on the filter coefficient and the reconfiguration error;
determine a second filter coefficient and a second reconfiguration error based on the first provisional image,
create a second provisional image based on the second filter coefficient and the second reconfiguration error,
determine a difference between the first and second provisional images; and
provide the second provisional image as an output image when the difference between the first and second provisional images satisfies a predetermined condition:
an image input apparatus configured to receive or create the input image, and to transmit the input image to the information processing apparatus; and
an image output apparatus configured to receive an output image created by the information processing apparatus, and to display or output the output image.

8. An information processing method, comprising:
receiving an input image;
calculating a local variation of a first pixel in the input image based on a difference in pixel value between the first pixel and a surrounding pixel of the focused pixel;
calculating, based on gradient values for pixel values of the input image, a region attribute value associated with each pixel of the first mage, wherein the region attribute value indicates a likelihood that a pixel belongs to a predetermined region in the input image,
calculating, based on the region attribute value, a regularization strength for each pixel of the input image;

calculating a filter coefficient for suppressing a variation between neighboring pixels in the input image based on the local variation and the regularization strength;

creating a second image by degrading the input image;

calculating a reconfiguration error between the input image and the second image; and creating a first provisional image based on the filter coefficient and the reconfiguration error.

9. The information processing method according to claim 8, further comprising creating the first provisional image by using a linear combination of an amount by which pixel values of the input image are processed using the filter coefficient, the pixel values of the input image, and the reconfiguration error.

10. The information processing method according to claim 8, further comprising creating the second image by at least one of decreasing a resolution of the input image and blurring the input image.

11. The information processing method according to claim 8, further comprising calculating the regularization strength for each pixel of the input image based on at least one of a first main component, a second main component, and a mean value of angles of a gradient value for the pixel value of each pixel in a local region of the input image, wherein the first main component, the second main component, and the mean value are each calculated using a main component analysis on the gradient value.

12. The information processing method according to claim 8, further comprising executing filter processing such that an order of magnitude of pixel values of a plurality of pixels surrounding the first pixel in the input image is the same as an order of magnitude of pixel values of a plurality of pixels surrounding a second pixel in an output image, wherein the first pixel corresponds to the second pixel.

13. The information processing method according to claim 8, further comprising:

determining a second filter coefficient and a second reconfiguration error based on the first provisional image, creating a second provisional image based on the second filter coefficient and the second reconfiguration error, determining a difference between the first and second provisional images; and providing the second provisional image as an output image when the difference between the first and second provisional images satisfies a predetermined condition.

14. A non-transitory computer-readable storage medium storing instructions that, when executed by a computer, enable the computer to implement a method comprising:

receiving an input image;

calculating a local variation of a first pixel in the input image based on a difference in pixel value between the first pixel and a surrounding pixel of the first pixel;

calculating, based on gradient values for pixel values of the input image, a region attribute value associated with each pixel of the input mage, wherein the region attribute value indicates a likelihood that a pixel belongs to a predetermined region in the input image;

calculating, based on the region attribute value, a regularization strength for each pixel;

calculating a filter coefficient for suppressing a variation between neighboring pixels in the input image based on the local variation and the regularization strength;

creating a second image by changing one or more attributes of the input image;

calculating a reconfiguration error between the input image and the second image; and creating a first provisional image based on the filter coefficient and the reconfiguration error.

15. The non-transitory computer-readable storage medium of claim 14, further storing instructions that, when executed by a computer, enable the computer to implement the method further comprising:

creating the second image by at least one of decreasing a resolution of the input image and blurring the input image.

16. The non-transitory computer-readable storage medium of claim 14, further storing instructions that, when executed by a computer, enable the computer to implement the method further comprising:

executing filter processing such that an order of magnitude of pixel values of a plurality of pixels surrounding the first pixel in the input image is the same as an order of magnitude of pixel values of a plurality of pixels surrounding a second pixel in an output image, wherein the first pixel corresponds to the second pixel.

17. The non-transitory computer-readable storage medium of claim 14, further storing instructions that, when executed by a computer, enable the computer to implement the method further comprising:

determining a second filter coefficient and a second reconfiguration error based on the first provisional image;

creating a second provisional image based on the second filter coefficient and the second reconfiguration error;

determining a difference between the first and second provisional images; and providing the second provisional image as an output image when the difference between the first and second provisional images satisfies a predetermined condition.

* * * * *